United States Patent [19]

Lipes

[11] Patent Number: 5,199,794
[45] Date of Patent: Apr. 6, 1993

[54] PLASTIC BAG WITH REUSABLE NECK CLOSURE BAND

[75] Inventor: Arnold Lipes, Montreal, Canada

[73] Assignee: Pamco, Inc., Lachine, Canada

[21] Appl. No.: 828,506

[22] Filed: Jan. 31, 1992

[51] Int. Cl.$^5$ ............................................. B65D 33/28
[52] U.S. Cl. ...................................................... 383/71
[58] Field of Search .................................... 383/71, 70

[56] References Cited

U.S. PATENT DOCUMENTS

| | | |
|---|---|---|
| 121,646 | 12/1871 | McGrane ............................. 383/71 |
| 2,849,171 | 8/1958 | O'Brien, Jr. .......................... 383/71 |
| 3,311,288 | 3/1967 | Lemelson ............................ 383/71 |
| 3,540,184 | 11/1970 | Ashton . | 
| 3,633,247 | 1/1972 | Clayton ............................... 383/71 |
| 3,759,438 | 9/1973 | Ruda .................................... 383/71 |
| 3,974,960 | 8/1976 | Mitchell ............................... 383/71 |
| 4,706,298 | 11/1987 | Lipes et al. ........................... 383/71 |

*Primary Examiner*—Stephen P. Garbe
*Attorney, Agent, or Firm*—Oblon, Spivak, McClelland, Maier & Neustadt

[57] ABSTRACT

A reusable neck closure band for a plastic bag and a method of securing same to a bag is disclosed. A closure band is formed from an elongated rectangular strip of plastic material and comprises a neck retention portion for retaining a bunched neck portion of the bag, and opposed free band portions. The neck retention portion is attached to the bag by a heat fused attachment. A detachable seal interconnects the free band portions together adjacent the bunched neck portion to restrain the bunched neck portion. The detachable seal is disconnected by pulling the free band portions away from one another to cause the detachable seal to detach to free the bunched neck portion of the bag. The bag is reclosable by tieing the free band portions together about a reformed bunched neck portion.

7 Claims, 2 Drawing Sheets

PLASTIC BAG WITH REUSABLE NECK CLOSURE BAND

BACKGROUND OF INVENTION

1. Field of Invention

The present invention relates to a reusable neck closure band for a plastic bag and a method of attaching same to the bag for securing a bunched neck portion of the bag.

2. Description of Prior Art

It is known to close plastic bags, such as bread bags, carrot bags, etc. by bunching the neck portion of the bag and securing the bunched neck portion by a detachable lock means such as twist wire connectors or plastic lock tabs. The disadvantage of these locking devices is that they often become lost when the bag is opened, or break and become unusable. Another disadvantage is that they are often difficult and time consuming to install on automatic bag filling machines. With the locking tabs consisting of small rectangular plastic plates having an open cavity therein accessible through a throat opening to receive the bunched neck portion of the plastic bag, it is possible to also print a limited amount of information on the tab such as an abbreviated date. It is also known to print information on tape-like tabs which are secured to the neck portion of bags, such as disclosed in U.S. Pat. No. 3,540,184 issued on Nov. 17, 1970. In this patent there is disclosed the securement of the neck of a bag by fusing a band about the neck to a bag formed of netting material. The neck of the bag is completely fused and once the bag is opened the tag is not reusable and the neck portion is usually cut off or damaged. Such bags are usually used for packaging poultry and are discarded once they are opened.

SUMMARY OF INVENTION

It is a feature of the present invention to provide a reusable neck closure band for a plastic bag and wherein the band is easily detachable to provide access to the bag and at the same time is secured to the bag and can be reused to resecure a bunched neck portion of the bag.

A further feature of the present invention is to provide a neck closure band secured to a plastic bag and made of the same material which is inexpensive to fabricate, and wherein the bag and the band are recyclable.

Another feature of the present invention is to provide a reusable neck closure band for a plastic bag and wherein the band is provided with two free elongated band portions on which printed matter can be provided on both band portions, and wherein the free band portions are attached together to secured a bunched neck portion of the bag by automatic machines and wherein the interconnected band portions are easily detachable from one another.

A still further feature of the present invention is to provide a method of securing a bunched neck portion of a plastic bag with a reusable neck closure band and which substantially overcomes the above mentioned disadvantages of the prior art.

According to the above features, from a broad aspect, the present invention provides the combination of a plastic bag having a reusable neck closure band. A band is formed of a plastic material and comprises a neck retention portion for retaining a bunched neck portion of the bag, and opposed free band portions. The neck retention portion is attached to the bag by a heat fused attachment. Detachable seal means interconnects the free band portions together adjacent the bunched neck portion to secure the bunched neck portion. The detachable seal means is disconnected by pulling the free band portions away from one another and from the seal means to cause the seal means to detach to free the bunched neck portion of the bag. The bag is reclosable by tieing the free band portions together about a reformed bunched neck portion.

According to a still further broad aspect of the present invention there is provided a method of securing a bunched neck portion of a plastic bag with a reusable neck closure band. The method comprises the steps of forming a bunched neck portion in a plastic bag. An elongated plastic band is applied to the bunched neck portion with the band having a retention portion for retaining the bunched neck portion and opposed free band portions. A heat fused attachment is formed in the band retention portion and a portion of the bunched neck portion to secure the band to the bag. A detachable seal is formed to interconnect the free band portions together adjacent the bunched neck portion to restrain the bunched neck portion.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
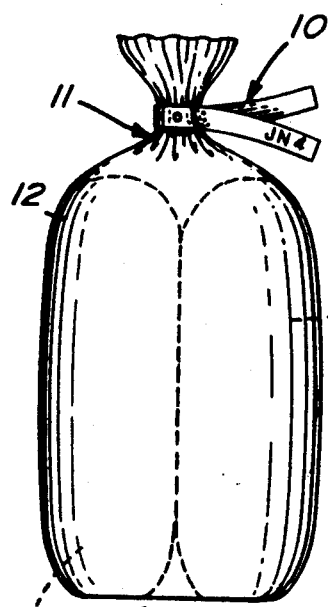
FIG. 1 is a perspective view of the plastic bag secured with a reusable neck closure band of the present invention.

Referring now to the drawings, and more particularly to FIGS. 1 to 5, there is shown generally at 10 the reusable neck closure band of the present invention which is attached to the bunched neck portion 11 of a plastic bag 12. The plastic bag may contain a variety of products, and as herein shown, milk pouches 13 are secured within the plastic bag 12.

Figure 2:
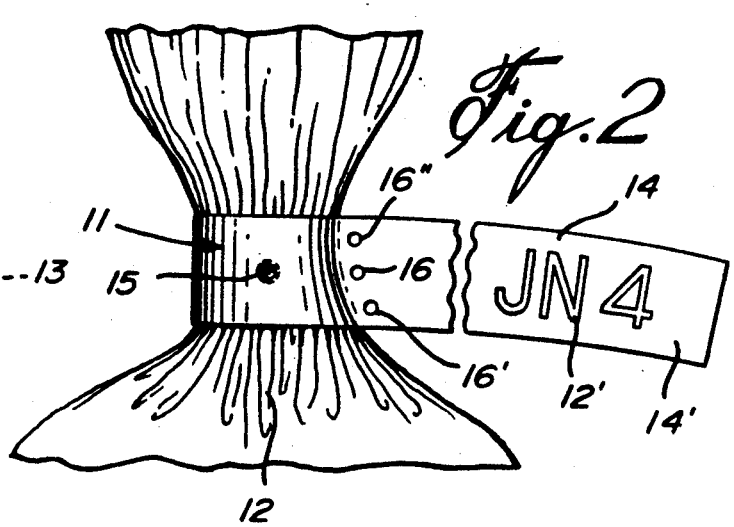
FIG. 2 is an enlarged view of the bunched neck portion of the bag showing the manner in which the reusable neck closure band is secured thereto.
Figure 3:
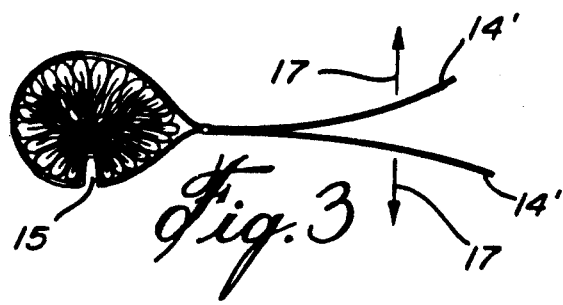
FIG. 3 is a sectional top view of the reusable neck closure band secured about a bunched neck portion of a bag.
Figure 4:
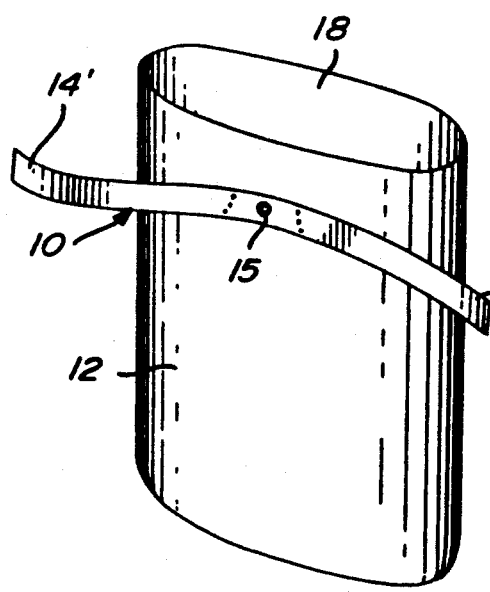
FIG. 4 is a perspective view showing the plastic bag in its open condition with the reusable neck closure band secured thereto.
Figure 5:
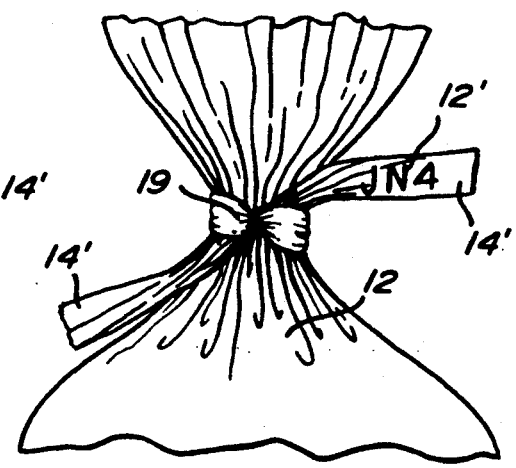
FIG. 5 is a fragmented section view showing the reusable neck closure band reattached to a reformed bunched neck portion of a bag.

As more clearly shown in FIG. 2, the reusable neck closure band 10 is comprised of an elongated rectangular band 14 of plastic material which is disposed about the bunched neck portion 11 of the bag 12 with the band being secured to the bag by a heat fused pinhole seal 15. The neck portion 11 of the bag is restrained in a bunched closed position by a detachable seal means which is comprised of one or more heat fused securement points, herein constituted by three pinhole heat seals 16. The pinhole seals 16 are spaced apart and offset laterally from the longitudinal axis of the free end portions 14' of the rectangular band 14. The reason for this is that, as the free end portions 14' of the neck closure bands are pulled apart, away from one another, as shown by arrows 17 in FIG. 3, the pinhole heat seals 16 will break away or detach in a progressive manner with pinhole seal 16' being the first to detach and thereafter the middle seal and then the outermost seal 16''. Accordingly, the bunched neck portion 11 of the bag 12 becomes detached for access to the content 13 of the bag through the open end 18 as shown in FIG. 4. As also shown in FIG. 4, the neck closure band 10 remains attached to the bag 12 by the heat fused attachment 15. Accordingly, when it is necessary to reclose the bag the bunched neck portion 11 is formed adjacent the heat fused attachment 15 and the opposed free band portions 14' are knotted together about the neck to form a securement knot 19, as shown in FIG. 5. As also shown in FIGS. 1, 2 and 5, a date stamp 20 or other printed information is carried on the free end portion of the band 1'. Printed information can also be provided on both free end portions of the band 1.

As can be appreciated, the reusable neck closure band of the present invention is easy to detach from the bunched neck portion of the bag and is easily reattachable thereto. The band also remains secured to the bag and cannot be lost.

Figure 6:
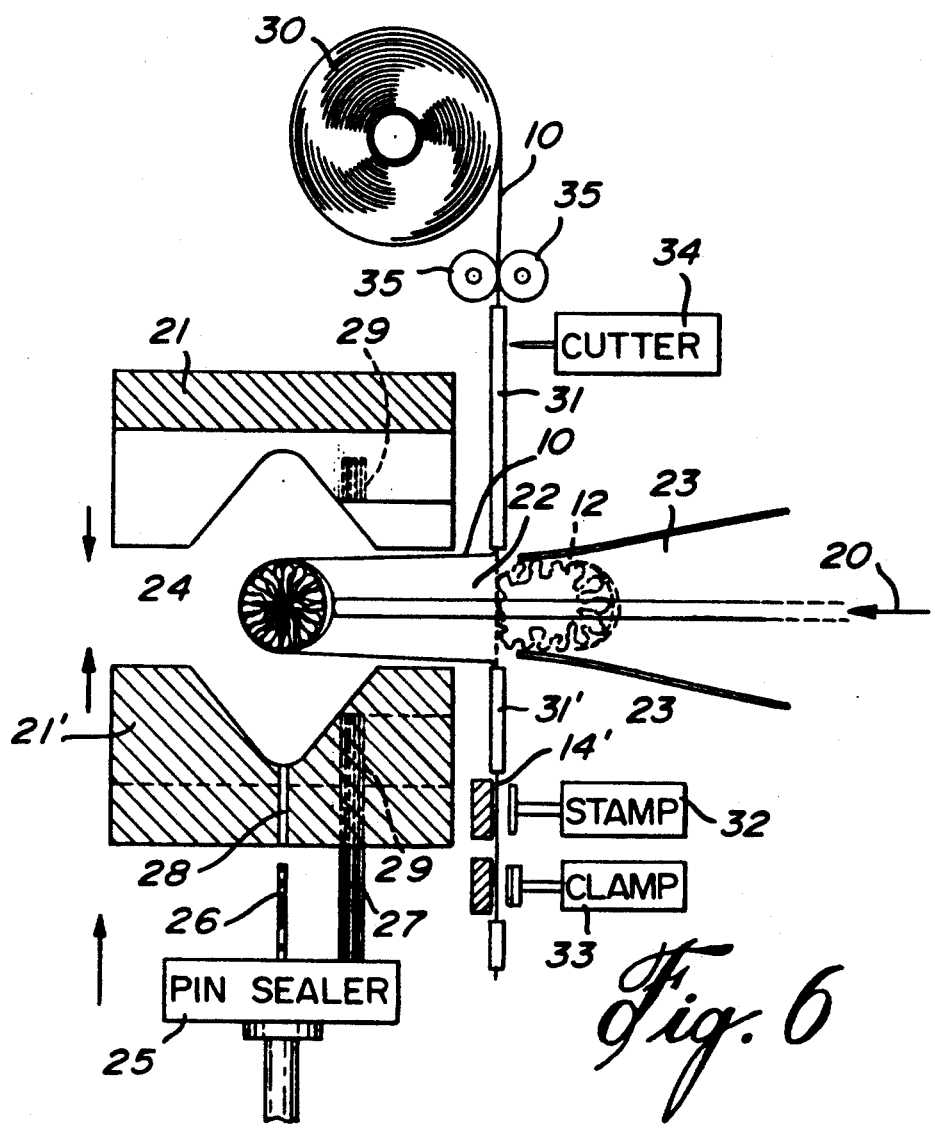
FIG. 6 is illustrates an embodiment of a machine capable of securing a bunched neck portion of a plastic bag with a reusable neck closure band.
Figure 7:
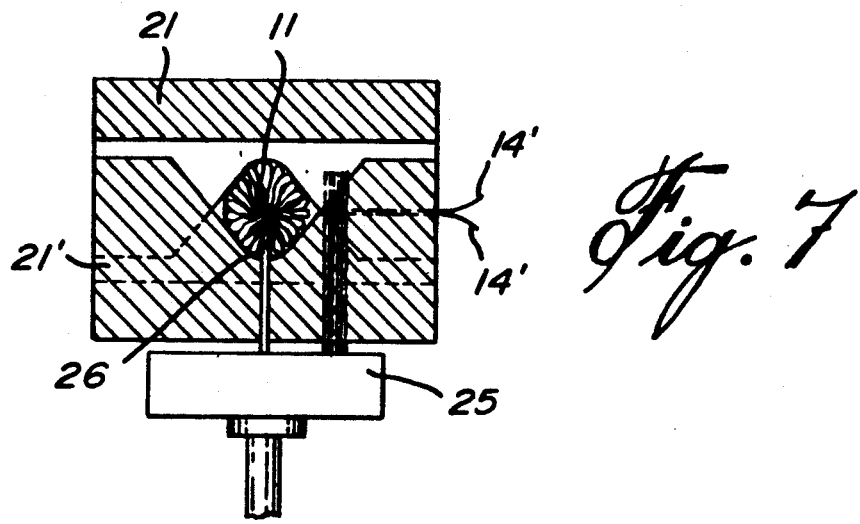
FIG. 7 is a further schematic view showing the manner in which the band is heat sealed to secure the bunched neck portion of the bag.

With further reference to FIGS. 6 and 7, the method of securing the bunched neck portion of the plastic bag with the reusable neck closure band 10 of the present invention will be described. As shown in FIG. 6, the plastic bag 12 with its contents is conveyed in the direction of arrow 20 towards a pair of open dies 21 and 21'. The bag is guided through a neck forming channel 22 defined by guide rods 23, so that once the bag 12 arrives at its closing position 24 between dies 21 and 21', the bunched neck portion 11 is formed. The upper bunched neck portion of the bag is maintained in an elevated position as it is moved into the dies. However, during its travel into the gap between the closing dies 21, the bunched neck portion has engaged a neck closure band 10 positioned in its path through guide means, not shown, at a precise location between the closing guides. The dies 21 are then closed and a pin sealer 25 is actuated whereby the hot sealing pins 26 and 27 are advanced in their guide holes 28 and 29, respectively, of the closing dies 21 and 21' so that the fusing attachment 15 and the detachable seal pinholes are formed. As herein shown, the pins 27 extend entirely across the free band portions 14 and 14' while the pin 26 extends only partway into the bunched neck portion 11, as shown in FIG. 7, so that the band is secured to a small section only of the bag wall adjacent the bunched neck portion. The closing dies are then reopened and the closed bag is released.

As shown in FIG. 6, once the bag 12 has been fed to its attachment position 24 between the dies 21, another section of band 10 is advanced from the roll 30 through guide means, herein guide channels 31 and 31' by a driven pinch roll set 35. One of the free end sections 14' of the band is date-stamped by a stamping machine 32 after the end of the band has been clamped by the clamp 33. A cutter 34 is then activated to cut the band to its proper length. It is pointed out that FIGS. 6 and 7 shows a schematic representation of an apparatus capable of carrying out the method of securing a reusable neck closure band about a bunched neck portion of a plastic bag, and that there are various other means of effectuating this band attachment.

It is within the ambit of the present invention to cover any obvious modifications of the preferred embodiment, provided such modifications fall within the scope of the appended claims.

I claim:

1. The combination of a plastic bag and a reusable neck closure band for said plastic bag, said band being formed of a plastic material and comprising a neck retention portion for retaining a bunched neck portion of said bag and opposed free band portions; said neck retention portion being attached to said bag by a heat fused attachment, and detachable sealing means interconnecting said free band portions together adjacent said bunched neck portion to restrain said bunched neck portion, said detachable sealing means being disconnected by pulling said free band portions away from one another and from said seal means to cause said sealing means to detach to free said bunched neck portion of said bag, said bag being reclosable by tieing said free band portions together about a reformed bunched neck portion.

2. The combination of claim 1 wherein said detachable sealing means is comprised of one or more heat fused securement points fusing said free band portions together adjacent said neck portion.

3. The combination of claim 2 wherein said heat fused securement points are pinhole heat seals.

4. The combination of claim 3 wherein there are two or more of said pinhole heat seals, said pinhole heat seals being spaced apart and offset laterally from the longitudinal axis of said free band portions so that said pinhole seals will detach progressively when said free band portions are pulled away from one another.

5. The combination of claim 4 wherein said heat fused attachment is a heat seal formed in said neck retention portion of said band and extending partly in said bunched neck portion of said bag.

6. The combination of claim 5 wherein said heat fused attachment is a further pinhole seal.

7. The combination of claim 5 wherein said band is an elongated rectangular band and wherein printed matter is affixed to one or both of said free band portions.

* * * * *